US009229468B2

(12) United States Patent
Pulli et al.

(10) Patent No.: US 9,229,468 B2
(45) Date of Patent: Jan. 5, 2016

(54) MAXIMUM POWER POINT TRACKING

(71) Applicant: ABB Oy, Helsinki (FI)

(72) Inventors: Tuomas Pulli, Espoo (FI); Janne Hellberg, Espoo (FI)

(73) Assignee: ABB OY, Helsinki (FI)

( * ) Notice: Subject to any disclaimer, the term of this patent is extended or adjusted under 35 U.S.C. 154(b) by 217 days.

(21) Appl. No.: 14/055,314

(22) Filed: Oct. 16, 2013

(65) Prior Publication Data

US 2014/0103885 A1    Apr. 17, 2014

(30) Foreign Application Priority Data

Oct. 16, 2012  (EP) ..................... 12188646

(51) Int. Cl.
*G05F 1/67* (2006.01)
*G05F 5/00* (2006.01)
*H02J 7/35* (2006.01)

(52) U.S. Cl.
CPC .. *G05F 5/00* (2013.01); *G05F 1/67* (2013.01); *Y02E 10/58* (2013.01)

(58) Field of Classification Search
CPC  H02M 7/42; H02M 2001/0025; Y02E 10/56; Y02E 10/563; Y02E 10/58; G05F 1/67; H02J 7/35
USPC .............. 323/299, 906; 307/43; 700/286, 297
See application file for complete search history.

(56) References Cited

U.S. PATENT DOCUMENTS

| | | | | |
|---|---|---|---|---|
| 4,404,472 | A * | 9/1983 | Steigerwald | 307/46 |
| 7,248,946 | B2 * | 7/2007 | Bashaw et al. | 700/286 |
| 7,432,691 | B2 * | 10/2008 | Cutler | 323/268 |
| 8,461,820 | B2 * | 6/2013 | Fieldhouse et al. | 323/299 |
| 8,754,627 | B1 * | 6/2014 | Le | 323/299 |
| 8,963,368 | B2 * | 2/2015 | Nair et al. | 307/43 |
| 8,965,589 | B2 * | 2/2015 | Zhao | 700/286 |
| 9,052,733 | B2 * | 6/2015 | Meredith-Jones et al. | 1/1 |
| 9,106,015 | B2 * | 8/2015 | Ohmura | 1/1 |
| 2013/0077366 | A1 * | 3/2013 | Kim et al. | 363/95 |

OTHER PUBLICATIONS

European Search Report dated Aug. 20, 2013.
(Continued)

*Primary Examiner* — Gary L Laxton
(74) *Attorney, Agent, or Firm* — Buchanan Ingersoll & Rooney PC

(57) ABSTRACT

A method and an arrangement of tracking a selected (e.g., maximum) power point of a photovoltaic system is disclosed, in which method an operation point of the photovoltaic system is changed based on the change of operation point and a change of power generated by the photovoltaic system. The method can include repeatedly determining a current or voltage of the photovoltaic system, determining a power of the photovoltaic system, determining a change of power of the photovoltaic system with respect to a previous determined power, and changing the operation point of the photovoltaic system by changing a current or voltage reference of the system stepwise depending on the change of power and a direction of a previous change of the current or voltage reference.

20 Claims, 2 Drawing Sheets

(56) References Cited

OTHER PUBLICATIONS

Salas V. et al., "Review of the maximum power point tracking algorithms for stand-alone photovoltaic systems", Solar Energy Materials and Solar Cells, Elsevier Science Publications, Amsterdam, NL, vol. 90, No. 11, Jul. 6, 2006, pp. 1555-1578.

Esram T. et al., "Comparison of Photovoltaic Array Maximum Power Point Tracking Techniques", IEEE Transactions on Energy Conversion, IEEE Service Center, Piscataway, NJ, US, vol. 22, No. 2, Jun. 1, 2007, pp. 439-449.

* cited by examiner

MAXIMUM POWER POINT TRACKING

RELATED APPLICATION(S)

This application claims priority under 35 U.S.C. §119 to European Patent Application No. 12188646.9, filed on Oct. 16, 2012, the entire content of which is hereby incorporated herein by reference in its entirety.

FIELD

The present disclosure relates to tracking a maximum power point in a photovoltaic power system, and, for example, to a maximum power point tracking in which an operation point of a photovoltaic system is changed based on a change of produced power.

BACKGROUND INFORMATION

In photovoltaic (PV) power generation systems, the operation point of panels can be driven to the best possible operation point, for example, to a point in which a maximum amount of power can be extracted from the panels. The most common maximum power point tracking (MPPT) method is the perturb & observe (P&O) method and its variations. In this method, the voltage or current reference can be constantly changed, and the produced change in generated power can be determined. On the basis of the change of power and the change of the reference value (voltage or current), it can be determined whether the reference should be decreased or increased for increasing the amount of extracted power.

The variations of a P&O algorithm include changing the sampling frequency or the step size of the reference on the basis of changes of the generated power and the given reference. Further modifications include using multiple samples for determining the change of power due to a changed reference.

The modifications of a P&O scheme can relate to increasing the accuracy of the scheme during changes in irradiation. For example, it is a known issue with P&O based algorithms that under constantly changing conditions the algorithms are not able to find the maximum power point.

FIG. 1 shows the operation of a P&O algorithm during a linear change of irradiation. During increasing irradiation at a time interval of 2 seconds to 9 seconds, the voltage of the panel system can be decreased during the whole interval, as can be seen in the lower plot of FIG. 1. As a consequence, the extracted power does not follow the linearly increasing irradiation as it should, as can be seen in the upper plot of FIG. 1. As such, an MPP algorithm cannot keep the operation point at a maximum power point. For example, at a time interval of 11 seconds to 19 seconds, the irradiation can be linearly decreased. The voltage of the panel system (lower plot) can be changed back and forth and can thus be kept almost at the same level. The extracted power (upper plot) cannot be at its maximum during the change.

The operation of the P&O method is disturbed by the changing irradiation since the observed change in power results from both the changed irradiation and the changed reference voltage or current. The method itself cannot separate the origin of the power change and therefore can arrive at wrong conclusions about the direction of the next voltage or current reference.

The maximum power point voltage of the panel does not change much even when the irradiation level changes from 500 W/m$^2$ to 1000 W/m$^2$. Therefore, the correct operation of the tracker can be affected and the tracker should change the voltage of the panel system in a controlled manner.

SUMMARY

A method of tracking a selected power point of a photovoltaic system is disclosed, in which an operation point of the photovoltaic system is changed based on a change of operation point and a change of power generated by the photovoltaic system, the method comprising: determining a current or voltage of the photovoltaic system; determining a power of the photovoltaic system; determining a change of power of the photovoltaic system with respect to a previous determined power; changing the operation point of the photovoltaic system by changing a current or voltage reference of the system stepwise depending on the change of power and a direction of a previous change of the current or voltage reference; storing determined values of current or voltage and the determined power (P(m)) of the photovoltaic system together with a time value (m); reading from the stored values a previous value of determined power (P(m)) and its time value (m) having a current or voltage value equaling a present current or voltage value for determination of the change of power ($\Delta$P) of the photovoltaic system; and calculating the change of power from the current value of power (P(k)), previous value of power (P(k−1)), stored value of power (P(m)) having a current or voltage value corresponding to a present current or voltage, and the time value (m) of the stored value of power (P(m)).

An arrangement for tracking a selected power point of a photovoltaic system is disclosed, in which arrangement an operation point of the photovoltaic system is changed based on a change of operation point and a change of power generated by a photovoltaic system, the arrangement comprising: a processor configured to: determine a current or voltage of a photovoltaic system; determine a power of the photovoltaic system; determine a change of power of the photovoltaic system with respect to a previous determined power; change the operation point of the photovoltaic system by changing a current or voltage reference of the system stepwise depending on the change of power and a direction of a previous change of the current or voltage reference; and a memory configured to: store determined values of current or voltage, and determined power of the photovoltaic system together with a time value; and wherein the processor is configured to determine the change of power ($\Delta$P) of the photovoltaic system by: reading from the stored values a previous value of determined power (P(m) and its time value (m) having a current or voltage value equaling a present current or voltage value; and calculating the change of power from the current value of power (P(k)), previous value of power (P(k−1)), stored value of power (P(m)) having a current or voltage value corresponding to a present current or voltage, and the time value (m) of the stored value of power (P(m)).

BRIEF DESCRIPTION OF THE DRAWINGS

The disclosure is explained below with reference to the exemplary embodiments shown in the drawings. In the drawings.

DETAILED DESCRIPTION

In accordance with an exemplary embodiment, a method and an arrangement for implementing the method are disclosed, which can store values of power and current or voltage used in the MPPT algorithm, and use the stored values for correcting the operation of the algorithm, and thereby enhance extraction of power.

In an exemplary embodiment, the historic data of the MPPT algorithm can be used and therefore no additional measurements are needed for correcting the operation of the algorithm. For example, only when no historic data about a present operation point is available can the operation point be changed to achieve an additional data point. The disclosure enables a selected (e.g., maximum) power to be extracted even under rapidly changing irradiation conditions.

The operation principle of a P&O MPPT algorithm is known per se. The P&O algorithm is based on perturbing the panel voltage or current and observing the change in panel power. When the voltage of the panel is increased, which can lead to an increase in power, the voltage is again increased to increase the power even further. If the voltage of the panel is increased and it causes the panel power to decrease, the voltage is decreased. When the voltage of the panel is decreased and the power output increases, the voltage is further decreased at the next instant, and if the power output decreases with a decreasing voltage step, the voltage of the panel is increased. For example, when in the P&O algorithm the obtained power increases, the panel voltage can be changed in the same direction as in a previous step, and when the power decreases, the voltage step can be made in an opposite direction as compared with a previous step.

In the P&O method, the operation can be continuously looped. An operation loop has functions in which the power of the panel can be determined, the change of power with respect to a previous value can be determined, the direction of the next change of voltage can be determined based on a previous direction of change and direction of power change, and the new voltage of the panel can be calculated. The calculated value of the panel voltage can be given to a controller that controls an electric apparatus connected to the output of the panel in such a manner that the actual panel voltage corresponds to the calculated reference value. When the operation point is changed, the loop can be started again. For example, the direction of change mentioned above refers to an increase or decrease of voltage or power.

Figure 2:
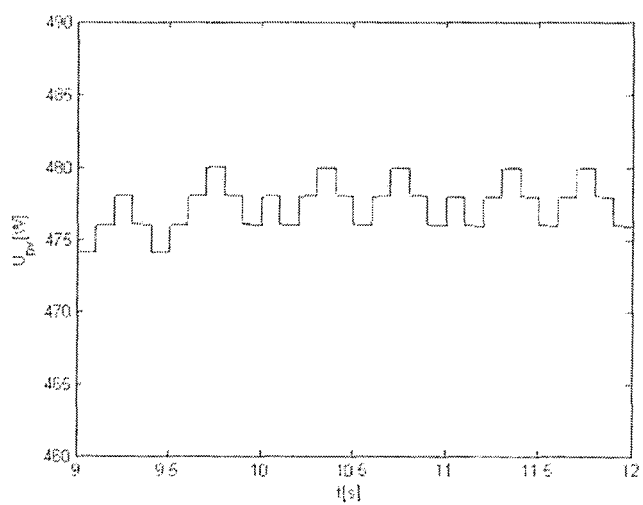
FIG. 2 shows voltage variations in a P&O algorithm.

In steady operating conditions, the voltage of the panel varies as shown in FIG. 2. As shown in FIG. 2, the voltage can vary stepwise after each sampling period, and in steady operating conditions the voltage can vary between three voltage levels.

In the present disclosure, each time the output voltage or output current of the panel is changed, the output voltage or output current and the obtained power can be stored together with a time instant, time stamp or a serial number n of the data. The serial number or the like can be a growing number increasing each time the operation is looped. If a serial number is used, the storage can happen with uniform time intervals. If, time stamps are stored with a data pair, it is not necessary for the storage to occur at uniform time intervals.

When the size of the voltage step is kept the same, the historic data contains values of power having a present voltage value. When such a voltage value is found from the history data, two separate values of power from two separate time instants can be provided.

According to the present disclosure, the change of power used in determining the direction of the next voltage change can be calculated based on a present time instant k value of power P(k), a previous value of power P(k−1), a stored value of power P(m) having a voltage value corresponding to a present voltage value and a time instant (m) of the stored value of power P(m).

In accordance with an exemplary embodiment, when the solar panel voltage is changed at a time step k, the power P(k) can be determined. In a basic P&O scheme, the change of power ΔP can be measured by subtracting a previous value of power from the current value P(k)−P(k−1), and the direction of the next voltage change can be based on the sign of the subtraction. In the present disclosure, a further compensation term $P_{comp}$ can be subtracted from the change of power ΔP.

The compensation term, $P_{comp}$, can be formed based on the assumption that a change in the power caused by the changing irradiation is linear. A gradient (of the change) can be calculated from the present operation point (k) and the saved historic data having the same voltage or current value as the present voltage or current (m).

In accordance with an exemplary embodiment, the gradient G can be calculated by subtracting the values of power P(k)−P(m) and dividing the result with the time interval between the values of power, for example:

$$G = \frac{P(k) - P(m)}{k - m}.$$

The compensation term $P_{comp}$ can then be calculated by multiplying the gradient by the time between the two latest steps, for example:

$$P_{comp} = G*(k-(k-1))$$

If the sampling time is varying, the gradient can be estimated by:

$$G = \frac{P(t) - P(t_{old})}{t - t_{old}}$$

and the compensation term as:

$$P_{comp} = G*T_{sample},$$

where t is the present time, $t_{old}$ is the time of the historic data, and $t_{sample}$ is the latest sample time period.

In accordance with an exemplary embodiment, the compensation term can remove the effect of the changed irradiation when the power changes linearly between the measurements. Although the change cannot be linear, the compensation term can still eliminate quite effectively the influence of the irradiation changes.

Further, in exemplary embodiments, the compensation term can be most accurate when a previous value of power with the present voltage value is as recent as possible, for example, when the time difference k−m between the power values is as small as possible. For example, it can be advisable to search for the corresponding stored value starting from the most recent value backwards. Once a corresponding voltage value is found, the search can be ended and the value can be used for calculating the compensation term.

In an exemplary embodiment, if the historic data has no value corresponding to the present voltage, the solar panel voltage can be changed by one step in a direction opposite to the previous direction of voltage change. After that the historic data contains a value of power corresponding to the present voltage, and therefore the compensation term can be calculated. Another option for a situation wherein no historic data is available is to ignore the calculation of the compensation term for that instant. When no compensation term is calculated, the values of power and voltage or current together with the time stamp can still be stored.

Figure 1:
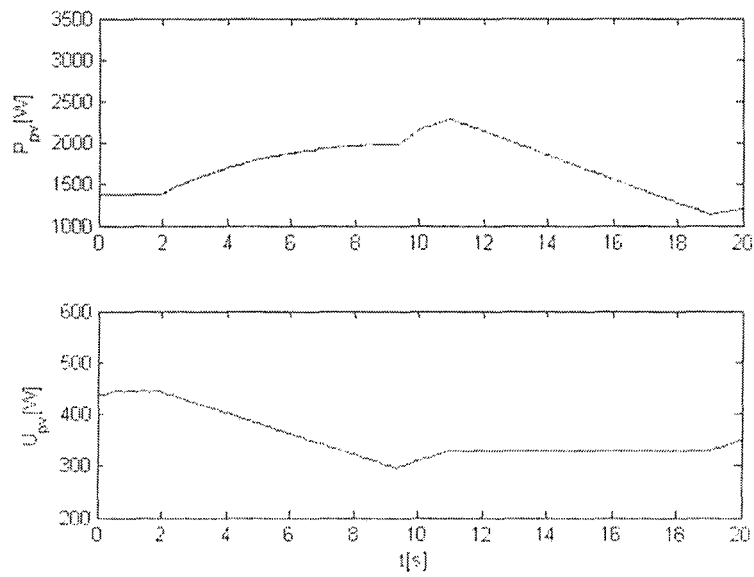
FIG. 1 shows power and voltage waveforms of a P&O algorithm with linearly changing irradiation.
Figure 3:
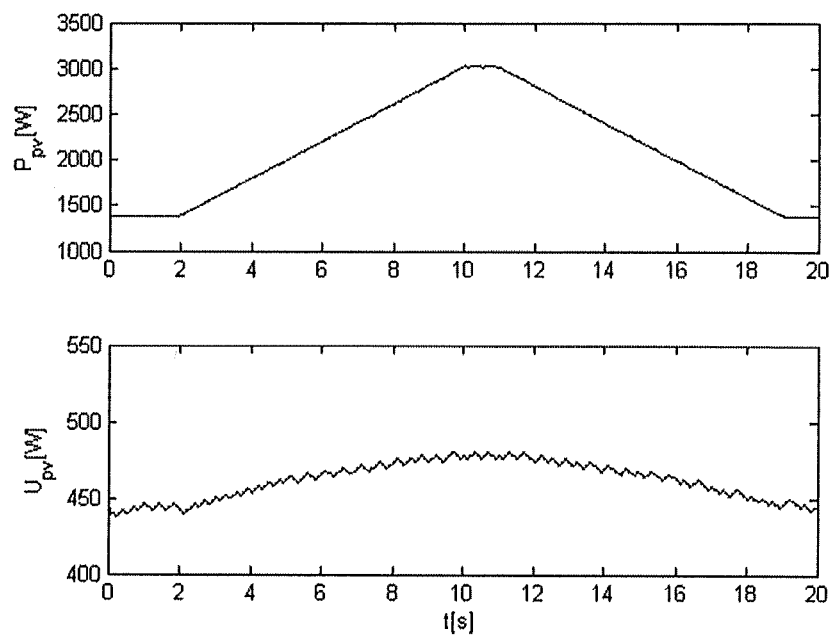
FIG. 3 shows power and voltage waveforms obtained from an exemplary MPP tracker of the present disclosure with linearly changing irradiation.

FIG. 3 shows simulated waveforms using the method of the disclosure with linearly increasing and decreasing irradiations as shown in FIG. 1. As seen in the lower plot of FIG. 3, the MPP voltage stays in the close vicinity of the voltage corresponding to the maximum power point voltage, and thereby the obtained power (upper plot) follows the changing irradiation.

The power of the solar panel system used in the method is not necessarily measured from the output of the panel system. As is known, the photovoltaic power generating system can include power electronic devices connected to the output of the panel system. The power electronic devices take care of the control of the system such that the voltage from the panel system can be controlled to the value given by the maximum power point tracker. Further, the electronic devices can be used for changing the voltage level of the extracted power and/or for inverting the voltage to alternating voltage so that the voltage can be fed to the grid. The power of the solar panel can be any measured power indicating the actual power so that the MPP tracker can operate. The power can be measured from the output of the power generating system, for example. Further, the power of the solar panel system can also be an estimated value corresponding to the actual value. The estimated power can be an estimate based on current measurement and estimated voltage. The estimated voltage can be the voltage value given as a reference to a converter that controls the output voltage of the panels. Another option for estimating the power can be to measure a current in a circuit structure in which the voltage has a constant value.

In the above description, the voltage of the panel system can be used together with the power of the panel system. It is to be understood that in the method, the current from the panel system can also be used in the place of voltage. For example, the maximum power point tracker can be based on using current together with power. In current based trackers, the current from the panel can be changed stepwise and the resulting power can be determined. On the basis of the change of power, the output current from the panel system can be controlled stepwise. The operation principle of the disclosure can be similar to that when using voltage.

The compensated power change $\Delta P$ can further be used in adapting the MPP algorithm since the magnitude of the term gives an indication of how far away the operating point is from the maximum power point. The adaptation can be carried out by modifying the amount of voltage or current which is changed. If the $\Delta P$ is great, a great step can be applied, and when the $\Delta P$ is small, the step size can be selected to be smaller. In an adaptation process it can be advisable to select a step size that is a multiple of the basic step size. The selection of a multiple of the basic step size can allow for a possibility that the historic data can still contain voltage or current values which will match present values.

The arrangement of the disclosure is adapted to carry out the method of the disclosure. The arrangement can include means for storing the required data and means for reading the stored data. For example, the means for storing the required data and means for reading the stored data can be a memory that can be indexed using a processor or the like. As is known, the maximum power point trackers need some processing capacity. In accordance with an exemplary embodiment, this same processing capacity can be used for implementing the novel features of the disclosure.

In accordance with an exemplary embodiment, the photovoltaic system mentioned above contains a photovoltaic panel system. For example, such a panel system can include any number of parallel or series connected photovoltaic elements. The photovoltaic system further can include a converter for the operation of the maximum power point tracker. For the purpose of the disclosure, the photovoltaic system can be a grid tied system or a stand-alone system providing power to a battery or to some other DC or AC load.

It will be obvious to a person skilled in the art that, as technology advances, the exemplary embodiments can be implemented in various ways. The disclosure and its embodiments are not limited to the examples described above but can vary within the scope of the claims.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of tracking a selected power point of a photovoltaic system, in which an operation point of the photovoltaic system is changed based on a change of operation point and a change of power generated by the photovoltaic system, the method comprising:

determining a current or voltage of the photovoltaic system;

determining a power of the photovoltaic system;

determining a change of power of the photovoltaic system with respect to a previous determined power;

changing the operation point of the photovoltaic system by changing a current or voltage reference of the system stepwise depending on the change of power and a direction of a previous change of the current or voltage reference;

storing determined values of current or voltage and the determined power ($P(m)$) of the photovoltaic system together with a time value ($m$);

reading from the stored values a previous value of determined power ($P(m)$) and its time value ($m$) having a current or voltage value equaling a present current or voltage value for determination of the change of power ($\Delta P$) of the photovoltaic system; and calculating the change of power from the current value of power ($P(k)$), previous value of power ($P(k-1)$), stored value of power ($P(m)$) having a current or voltage value corresponding to a present current or voltage, and the time value ($m$) of the stored value of power ($P(m)$).

2. The method of tracking a selected power point according to claim 1, wherein the calculation of the change of power comprises:

calculating a difference between the current value of power ($P(k)$) and the previous value of power ($P(k-1)$) and subtracting a compensation term ($P_{comp}$) from the calculated difference, the compensation term being calculated by calculating a gradient ($G$) of change of power from a present operating point ($k$) and stored historic data having a same voltage or current value as the present voltage or current ($m$) as:

$$G = \frac{P(k) - P(m)}{k - m}$$

and multiplying the calculated gradient (G) by a time interval between the values of power for obtaining the compensation term as:

$$P_{comp} = G*(k-(k-1)).$$

3. The method of tracking a selected power point according to claim 1, wherein if the stored values do not include the current or voltage value equaling the present current or voltage value, the method comprises:
  changing the current or voltage reference in a direction opposite to a previous change of the current or voltage reference.

4. The method of tracking a selected power point according to claim 1, comprising:
  using the change of power (ΔP) for adapting a current or voltage step size.

5. The method of tracking a selected power point according to claim 1, wherein the determination of the current or voltage of the photovoltaic system comprises:
  measuring an output voltage or output current of a photovoltaic panel system of the photovoltaic system.

6. The method of tracking a selected power point according to claim 1, wherein the determination of the current or voltage of a photovoltaic system comprises:
  estimating an output voltage or output current of a photovoltaic panel system of the photovoltaic system.

7. The method of tracking a selected power point according to claim 1, wherein the determination of the current or voltage of a photovoltaic system comprises:
  using a reference value of the current or voltage.

8. The method of tracking a selected power point according to claim 1, wherein the determination of the power of a photovoltaic system comprises:
  determining power obtained from a panel system of the photovoltaic system.

9. The method of tracking a selected power point according to claim 1, wherein the determination of the power of the photovoltaic system comprises:
  determining power in a converter used in a photovoltaic system.

10. The method of tracking a selected power point according to claim 1, wherein the determination of the power of the photovoltaic system comprises:
  determining a power outputted by a photovoltaic system.

11. The method of tracking a selected power point according to claim 1, comprising:
  repeatedly determining a current or voltage of the photovoltaic system;
  repeatedly determining a power of the photovoltaic system; and
  repeatedly determining a change of power of the photovoltaic system with respect to a previous determined power.

12. An arrangement for tracking a selected power point of a photovoltaic system, in which arrangement an operation point of the photovoltaic system is changed based on a change of operation point and a change of power generated by a photovoltaic system, the arrangement comprising:
  a processor configured to:
    determine a current or voltage of a photovoltaic system;
    determine a power of the photovoltaic system;
    determine a change of power of the photovoltaic system with respect to a previous determined power;
    change the operation point of the photovoltaic system by changing a current or voltage reference of the system stepwise depending on the change of power and a direction of a previous change of the current or voltage reference; and
  a memory configured to:
    store determined values of current or voltage, and determined power of the photovoltaic system together with a time value; and
  wherein the processor is configured to determine the change of power (ΔP) of the photovoltaic system by:
    reading from the stored values a previous value of determined power (P(m)) and its time value (m) having a current or voltage value equaling a present current or voltage value; and
  calculating the change of power from the current value of power (P(k)), previous value of power (P(k−1)), stored value of power (P(m)) having a current or voltage value corresponding to a present current or voltage, and the time value (m) of the stored value of power (P(m)).

13. The arrangement for tracking a selected power point according to claim 12, wherein the calculation of the change of power comprises:
  calculating a difference between the current value of power (P(k)) and the previous value of power (P(k−1)) and subtracting a compensation term ($P_{comp}$) from the calculated difference, the compensation term being calculated by calculating a gradient (G) of change of power from a present operating point (k) and stored historic data having a same voltage or current value as the present voltage or current (m) as:

$$G = \frac{P(k) - P(m)}{k - m}$$

and multiplying the calculated gradient (G) by a time interval between the values of power for obtaining the compensation term as $$P_{comp} = G*(k-(k-1)).$$

14. The arrangement for tracking a selected power point according to claim 12, wherein when the stored values do not include the current or voltage value equaling the present current or voltage value, the processor is configured for:
  changing the current or voltage reference in a direction opposite to a previous change of the current or voltage reference.

15. The arrangement for tracking a selected power point according to claim 12, wherein the processor is configured for:
  using the change of power (ΔP) for adapting a current or voltage step size.

16. The arrangement for tracking a selected power point according to claim 12, wherein the determination of the current or voltage of the photovoltaic system comprises:
  measuring an output voltage or output current of a photovoltaic panel system of the photovoltaic system.

17. The arrangement for tracking a selected power point according to claim 12, wherein the determination of the current or voltage of the photovoltaic system comprises:
  estimating an output voltage or output current of a photovoltaic panel system of the photovoltaic system.

18. The arrangement for tracking a selected power point according to claim 12, wherein the determination of the current or voltage of a photovoltaic system comprises:
  using the reference value of the current or voltage.

19. The arrangement for tracking a selected power point according to claim 12, wherein the determination of the power of a photovoltaic system comprises:
  determining power obtained from a panel system of photovoltaic system.

20. The arrangement for tracking a selected power point according to claim 12, wherein the determination of power of a photovoltaic system comprises:
  determining power in a converter used in a photovoltaic system.

* * * * *